United States Patent
Kim et al.

(10) Patent No.: US 6,885,849 B1
(45) Date of Patent: Apr. 26, 2005

(54) AUTOMATICALLY CLOSABLE MOBILE TELEPHONE

(75) Inventors: Ki-Hyun Kim, Suwon-shi (KR); Kwang-Ho Jeong, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 435 days.

(21) Appl. No.: 09/611,021

(22) Filed: Jul. 6, 2000

(30) Foreign Application Priority Data

Jul. 6, 1999 (KR) ........................................ 1999-27131

(51) Int. Cl.⁷ ................................................. H04B 1/38
(52) U.S. Cl. ................ 455/90.3; 455/550.1; 455/575.1; 455/575.3; 455/575.4; 455/575.8; 379/433.12
(58) Field of Search ....................... 379/433.12, 433.13; 455/550.1, 575.1, 575.3, 575.4, 575.8, 90.3

(56) References Cited

U.S. PATENT DOCUMENTS

| | | | | |
|---|---|---|---|---|
| 4,124,055 A | * | 11/1978 | Aspenson et al. .......... 160/193 |
| 5,148,471 A | * | 9/1992 | Metroka et al. ............ 455/563 |
| 5,151,946 A | * | 9/1992 | Martensson ................ 455/550 |
| 5,636,275 A | * | 6/1997 | Takagi et al. .......... 379/433.13 |
| 5,649,309 A | * | 7/1997 | Wilcox et al. ........... 455/575.3 |
| 5,668,867 A | * | 9/1997 | Nagai .................... 379/433.13 |
| 5,799,079 A | | 8/1998 | Inoue ......................... 379/433 |
| 5,923,751 A | | 7/1999 | Ohtsuka et al. ............. 379/433 |
| 6,073,027 A | * | 6/2000 | Norman et al. .......... 455/575.4 |
| 6,104,808 A | * | 8/2000 | Alameh et al. ......... 379/433.02 |
| 6,125,289 A | * | 9/2000 | Lee ............................. 455/575 |
| 6,131,042 A | * | 10/2000 | Lee et al. ................ 455/556.1 |
| 6,314,183 B1 | * | 11/2001 | Pehrsson et al. ....... 379/433.06 |
| 6,359,984 B1 | * | 3/2002 | Kim ...................... 379/433.02 |
| 6,374,089 B1 | * | 4/2002 | Till ........................... 455/90.1 |
| 6,384,813 B1 | * | 5/2002 | Narva ........................ 345/173 |
| 6,438,228 B1 | * | 8/2002 | Jeong et al. ........... 379/433.13 |
| 6,542,721 B2 | * | 4/2003 | Boesen .............................. 1/1 |
| 6,615,058 B2 | * | 9/2003 | Nagai ........................ 455/566 |
| 6,628,974 B1 | * | 9/2003 | Lim ...................... 379/433.11 |
| 2001/0039193 A1 | * | 11/2001 | Pan ............................ 455/550 |

FOREIGN PATENT DOCUMENTS

| | | | | |
|---|---|---|---|---|
| KR | | 1009104 A2 | * | 6/2000 |
| WO | | WO 92/09163 | * | 5/1992 |
| WO | | WO9209163 | * | 5/1992 |

* cited by examiner

*Primary Examiner*—Nay Maung
*Assistant Examiner*—Sujatha Sharma
(74) *Attorney, Agent, or Firm*—Dilworth & Barrese LLP (57) ABSTRACT

A mobile telephone having a main body and a sub-body closably mounted on the main body. The mobile telephone includes an opening/closing device installed in the main body, for automatically opening and closing the sub-body against the main body; a switch located at a specific place on the main body, for driving the opening/closing device; a detector for detecting an opening angle of the opening/closing device; and a controller for controlling rotation of the opening/closing device to a predetermined opening angle by analyzing an output of the detector.

10 Claims, 12 Drawing Sheets

AUTOMATICALLY CLOSABLE MOBILE TELEPHONE

This application claims priority to an application entitled "Automatically Closable Mobile Telephone" filed in the Korean Industrial Property Office on Jul. 6, 1999 and assigned Serial No. 99-27131, the contents of which are hereby incorporated by reference.

BACKGROUND OF THE INVENTION

1. Field of the Invention

The present invention relates generally to a mobile telephone, and in particular, to an automatically closable mobile telephone in which a sub-body (flip or a folder) for protecting a keypad or an LCD (Liquid Crystal Display) can be automatically opened and closed against a main body by a simple switching operation by a user.

2. Description of the Related Art

Currently, mobile telephones are becoming increasingly smaller in size and support multiple functions to meet the user's various demands. Thus, the speaker, earpiece, flip cover, folder and keypad of the mobile telephone are also smaller in size but still support the multiple functions.

Figure 1:
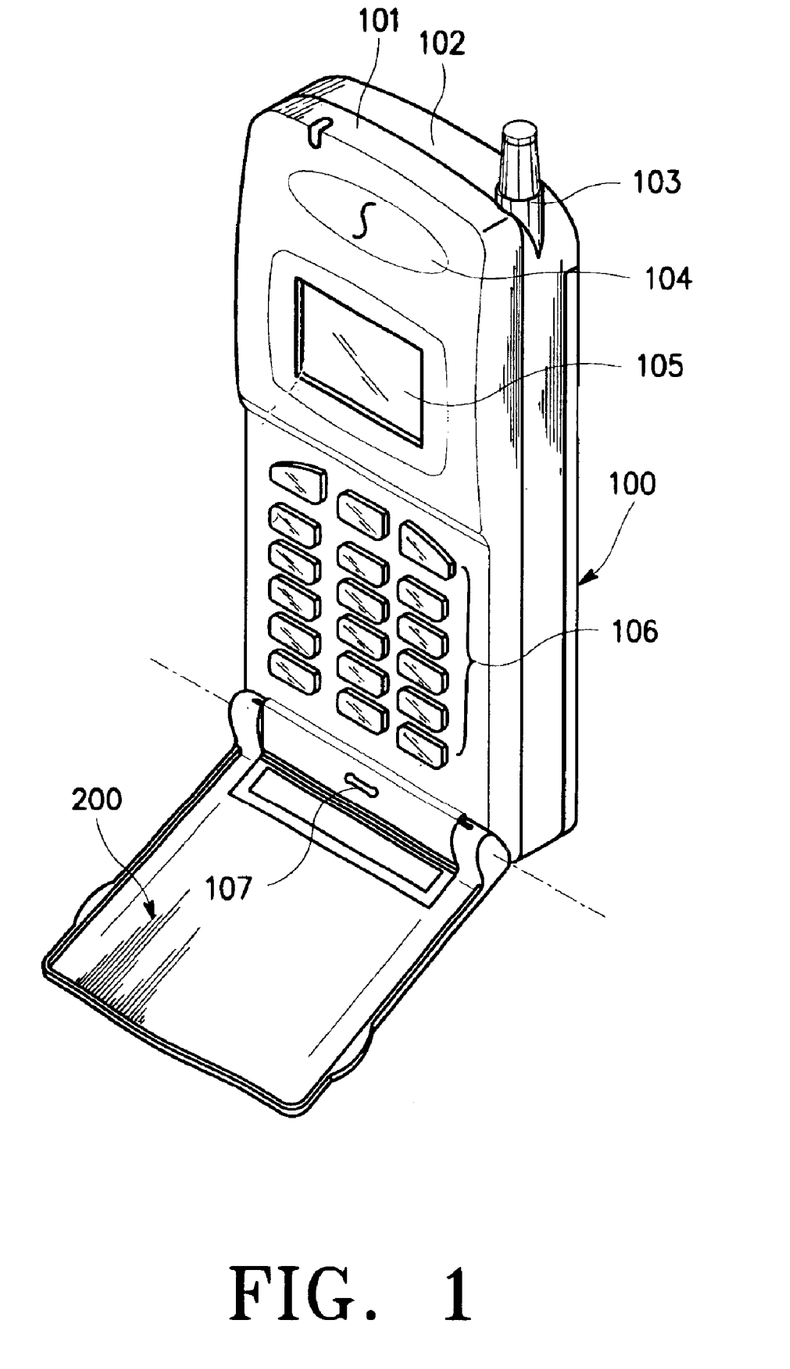
FIG. 1 is a perspective view illustrating a general flip-type mobile telephone.

FIG. 1 shows a general flip-type mobile telephone, which is a typical manually closable mobile telephone.

Referring to FIG. 1, the flip-type mobile telephone is comprised of a main body 100, a flip cover (or sub-body) 200 and a hinge device (not shown) for mechanically opening the flip cover 200 at a specific angle. The sub-body may also include a folder cover for a folder-type telephone.

The main body 100 is comprised of an upper casing frame 101, a lower casing frame 102, and an antenna device 103 mounted at one side of an upper end thereof. Further, the main body 100 includes an earpiece 104 placed at an upper side thereof, a display 105 placed at a lower side of the earpiece 104, and a keypad 106 with multiple key buttons, mounted at a lower side thereof. In addition, the main body 100 includes a microphone 107 for converting a voice signal to an electric signal, which is mounted at a lower side of the keypad 106.

The flip cover 200 for protecting the keypad on the main body and concentrating a voice on the microphone is mounted by the hinge device such that the flip cover may be freely opened and closed against the main body. For a telephone conversation, the user opens the flip cover by hand, which is very inconvenient especially if he or she has other things to do, for example, while driving.

Although not shown, the folder-type mobile telephone also has the same problem.

SUMMARY OF THE INVENTION

It is, therefore, an object of the present invention to provide an opening/closing device for automatically opening and closing a flip or a folder of a mobile telephone by a simple switching operation by the user.

To achieve the above and other objects, there is provided a closable mobile telephone including a main body and a sub-body closably mounted on the main body. The mobile telephone includes an opening/closing device installed in the main body, for automatically opening and closing the sub-body against the main body; a switch conveniently located on the main body, for driving the opening/closing device; a detector for detecting an opening angle of the opening/closing device; and a controller for controlling rotation of the opening/closing device at a predetermined opening angle by analyzing an output of the detector.

According to a preferred embodiment of the present invention, the opening/closing device includes a hollow module housing with a through hole formed at one end thereof; a decelerating module fixedly inserted in the module housing; and a sub-body coupler fixed to an end of a driving module of the decelerating module, a part of the sub-body coupler projecting from the through hole of the module housing and being fixed to a side of the sub-body. The decelerating module includes a driving motor; and a decelerating device coupled to the driving motor, for reducing the number of rotations and increasing a driving force of the driving motor.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

An automatically closable mobile telephone according to an embodiment of the present invention is comprised of an opening/closing device assembled in a main body, for opening and closing a sub-body against the main body; a switch conveniently located on the main body, for driving the opening/closing device; a detector for detecting a driving angle of the opening/closing device; and a controller for controlling an opening angle of the opening/closing device depending on the output of the detector.

Figure 2:
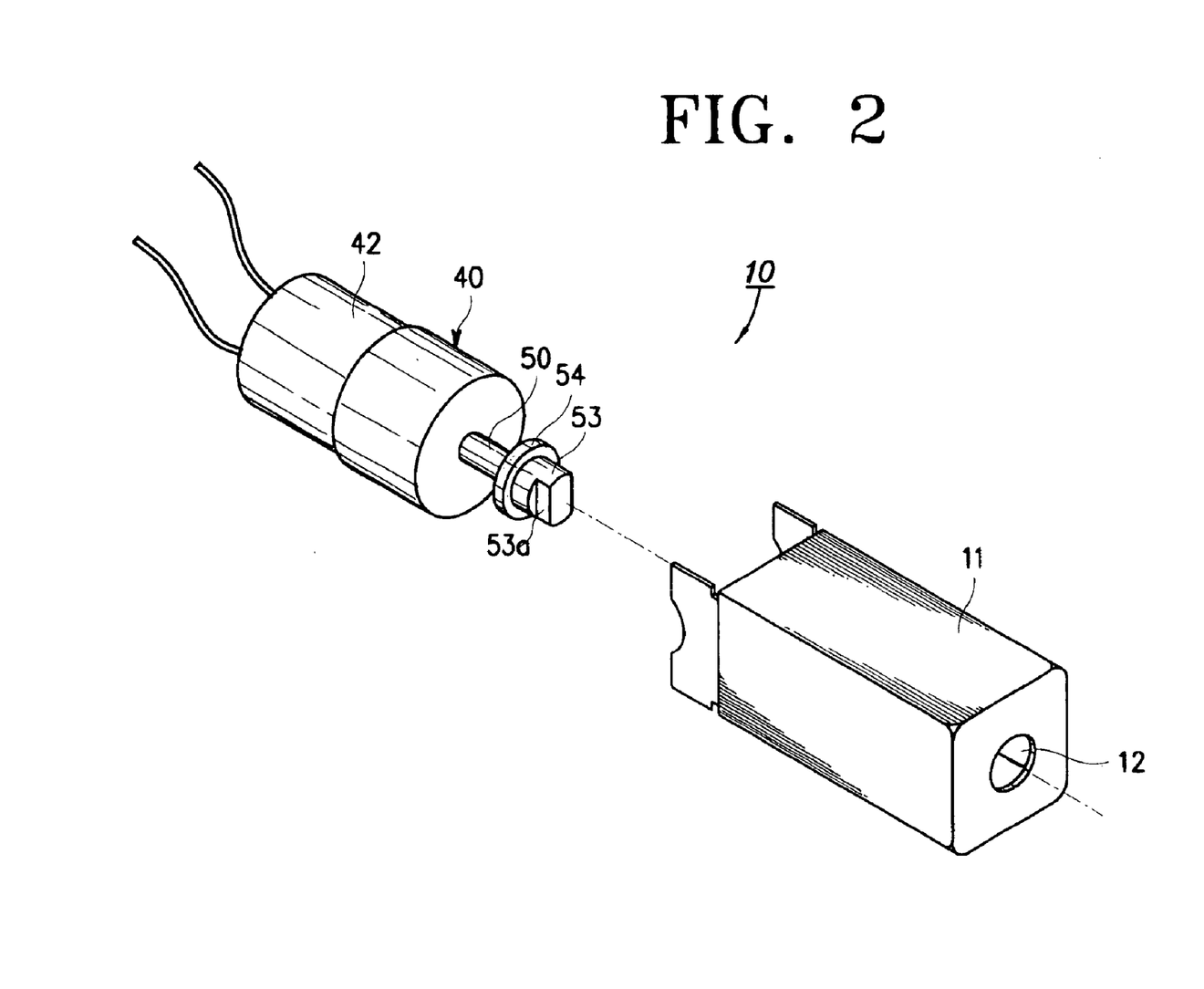
FIG. 2 is a perspective view illustrating an opening/closing device according to an embodiment of the present invention in a disassembled state.
Figure 3:
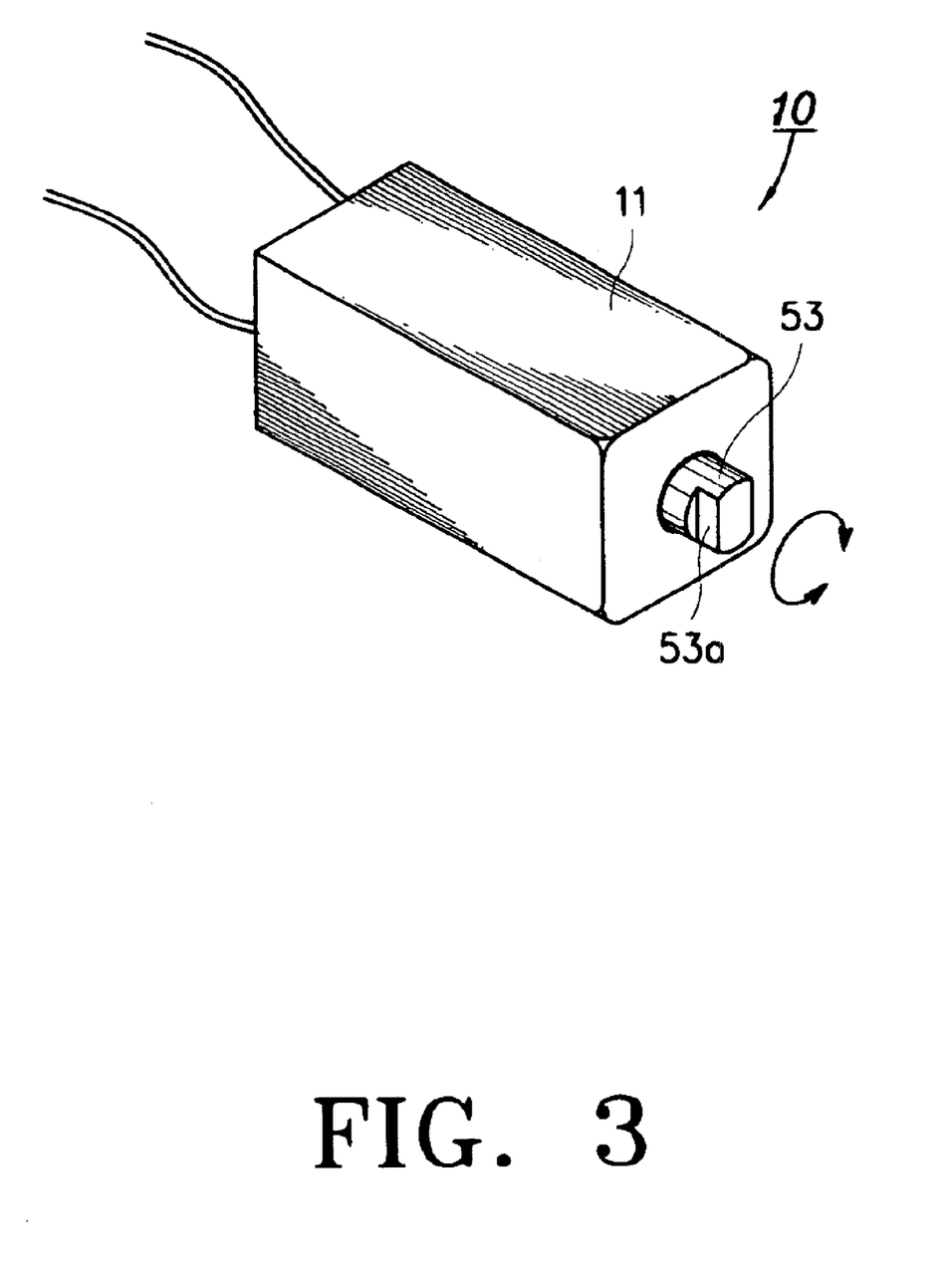
FIG. 3 is a perspective view illustrating the opening/closing device in an assembled state.

FIG. 2 shows an opening/closing device according to an embodiment of the present invention in a disassembled state. FIG. 3 shows the opening/closing device in an assembled state. Referring to FIGS. 2 and 3, an opening/closing device 10 includes a hollow module housing 11 with a through hole 12 formed at an end thereof, a decelerating module 40 fixedly inserted in the module housing 11, and a sub-body coupler 53 fixed to an end of a driving shaft 50 of the decelerating module 40. A part of the sub-body coupler 53 projects from the through hole 12 of the module housing 11 and is fixed to the sub-body. The sub-body coupler 53 is rounded and has flat surfaces 53a so that it may rotate together with the sub-body when coupled to the sub-body. In addition, a stopping projection 54 is formed along a circumference of the sub-body coupler 53 so that the sub-body coupler 53 may not escape from the though hole 12 of the module housing 11.

Figure 4:
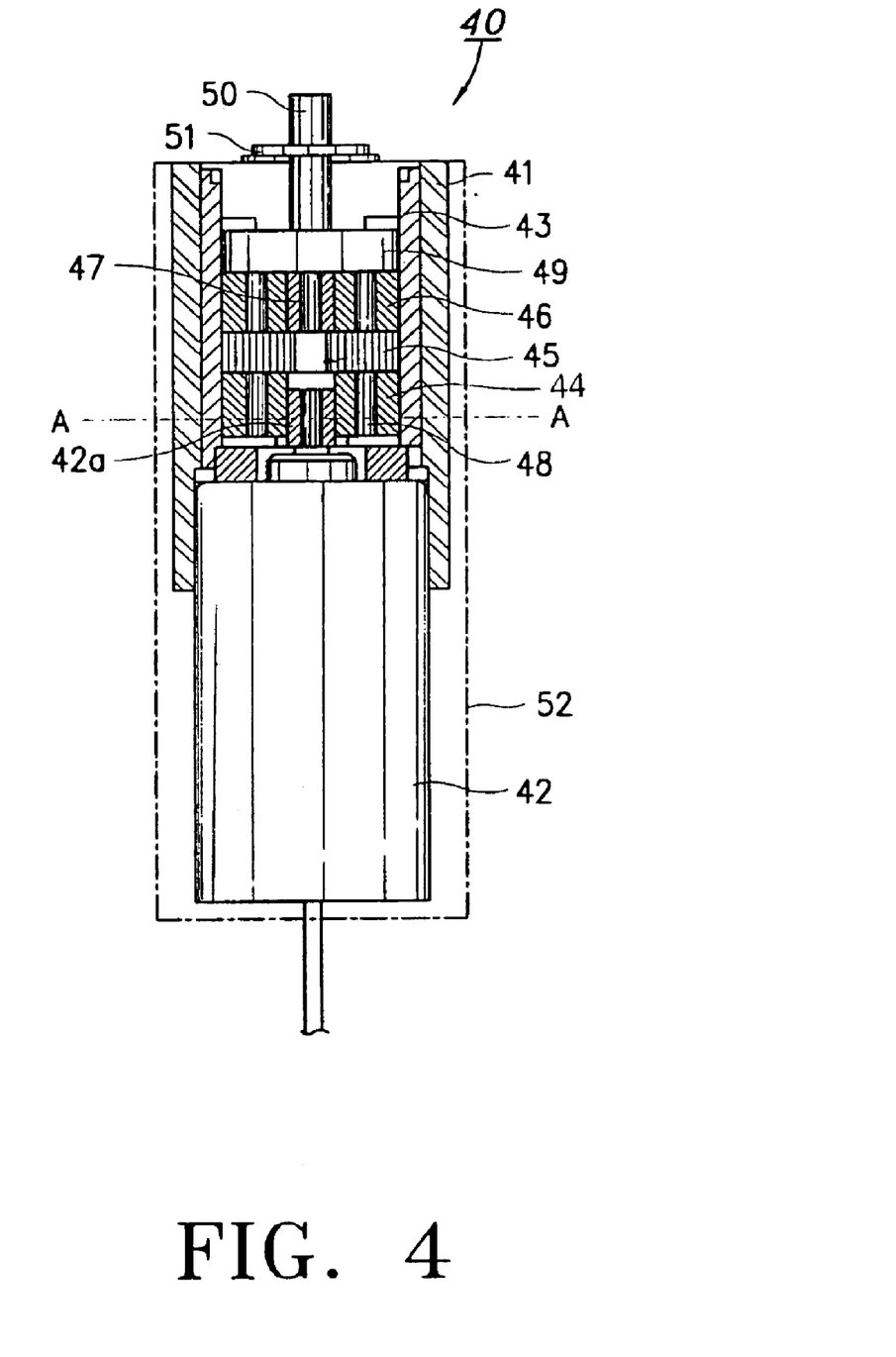
FIG. 4 is a cross-sectional view illustrating a decelerating module of the opening/closing device according to an embodiment of the present invention.
Figure 5:
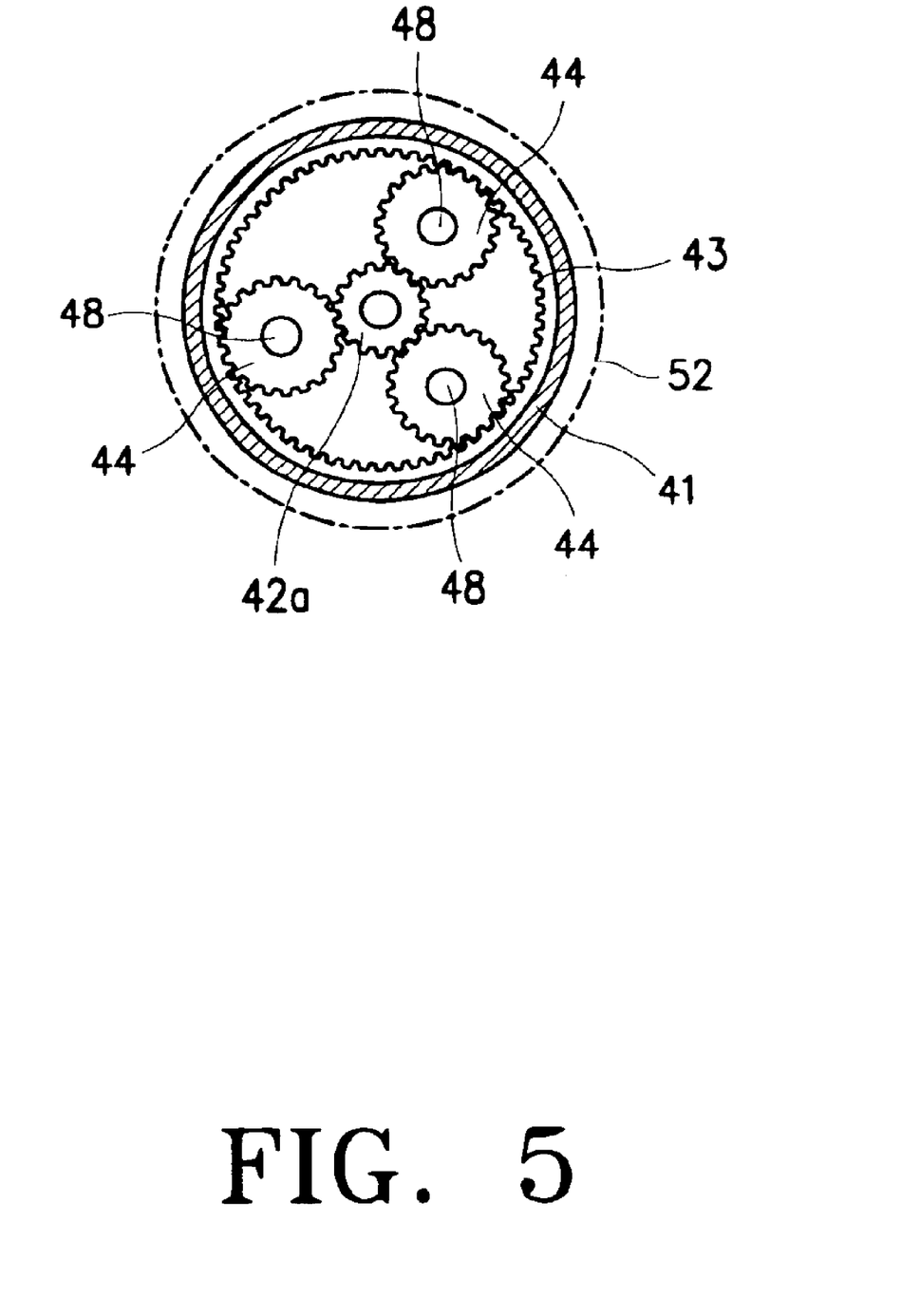
FIG. 5 is a cross-sectional view taken on line A-A' of FIG. 4.

FIG. 4 is a cross-sectional view illustrating a decelerating module of the opening/closing device according to an embodiment of the present invention. FIG. 5 is a cross-sectional view taken on line A-A' of FIG. 4.

Referring to FIGS. 4 and 5, the decelerating module 40 of the opening/closing device 10 is comprised of a cylindrical module housing 41, a driving motor 42 with a spur gear 42a coupled to its shaft at one side of the module housing 41, a guide gear 43 with teeth formed on the inner circumference of the module housing 41, at least two spur gears 44 each engaged with both the teeth of the guide gear 43 and the spur gear 42a of the driving motor 42, each of the spur gears 44 having a self-rotatable shaft 48, and a rotary plate 49 rotatably mounted on ends of the shafts 48. The rotary plate 49 is fixed to the driving shaft 50 at the center of the upper surface thereof.

In a preferred embodiment of the present invention, there are provided 3 spur gears 44 which are engaged with both the teeth of the guide gear 43 and the spur gear 42a. When the spur gear 42a of the driving motor 42 rotates, the spur gears 44 self-rotate while revolving around the driving shaft 50 along the inner circumference of the guide gear 43 in the rotating direction of the driving motor 42.

Further, in order to increase a driving force of the driving shaft 50, at least two spur gears 46 may be coaxially formed on the shafts 48 in a multi-layer structure using a spacer 45. In this case, there is provided an idle gear 47 which is simultaneously engaged with the multi-layered spur gears 46 to assist the spur gears 46 in revolving along the inner circumference of the guide gear 43.

Since one end of each of the shafts 48 is rotatably connected to the rotary plate 49, if the spur gear 42a of the driving motor 42 rotates, the spur gears 44 engaged with it will revolve around the guide gear 43, so that the revolving spur gears 44 and shafts 48 will rotate the rotary plate 49. When the rotary plate 49 rotates, the driving shaft 50 rotates which is fixed to the upper central surface of the rotary plate 49 by an E-ring 51. At this point, the driving shaft 50 will have a reduced rotation number and increased driving force, as compared with the driving motor 42.

Figure 6:
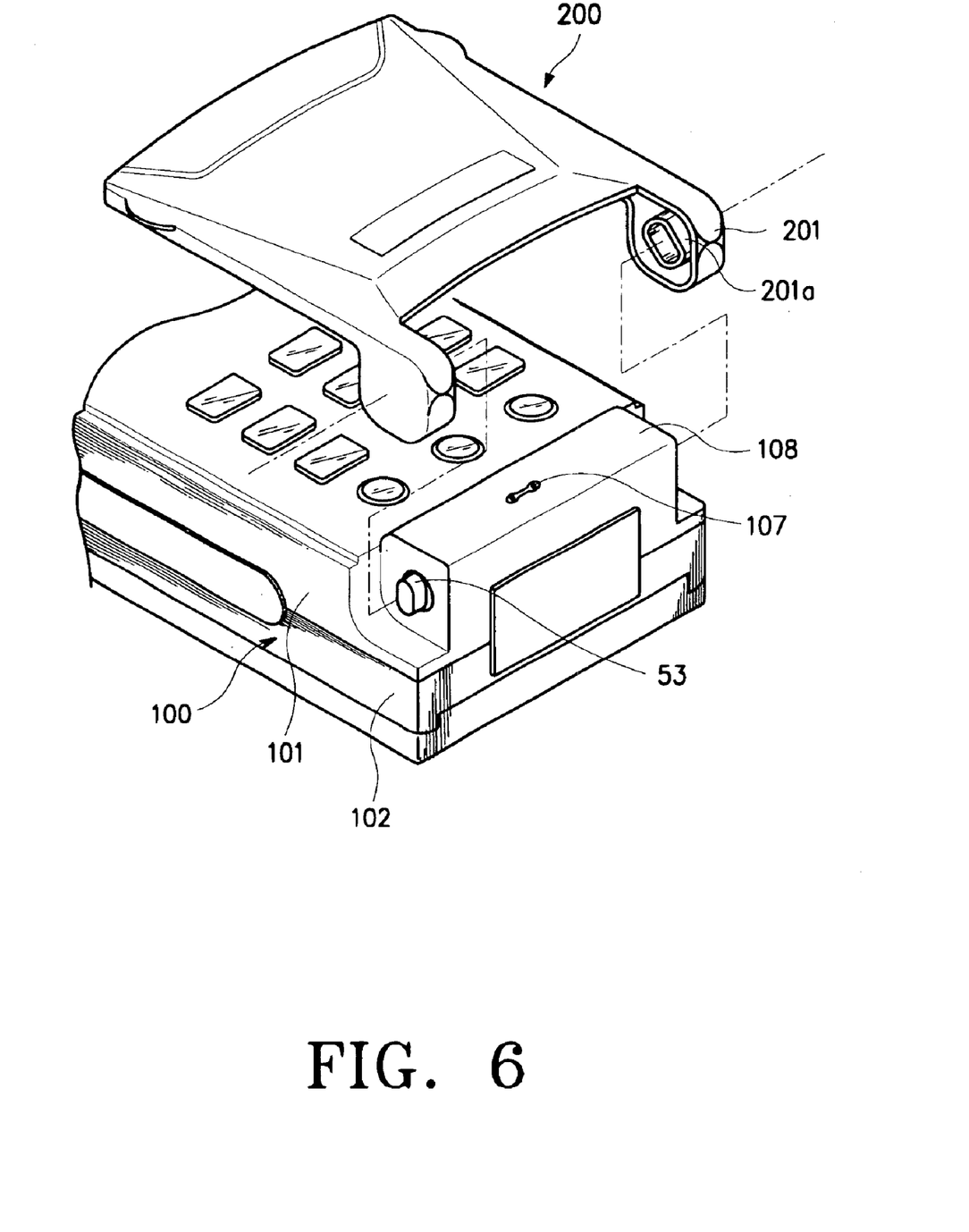
FIG. 6 is a partial exploded perspective view illustrating a flip cover and a main body of the telephone to which the opening/closing device according to the present invention is applied.
Figure 7:
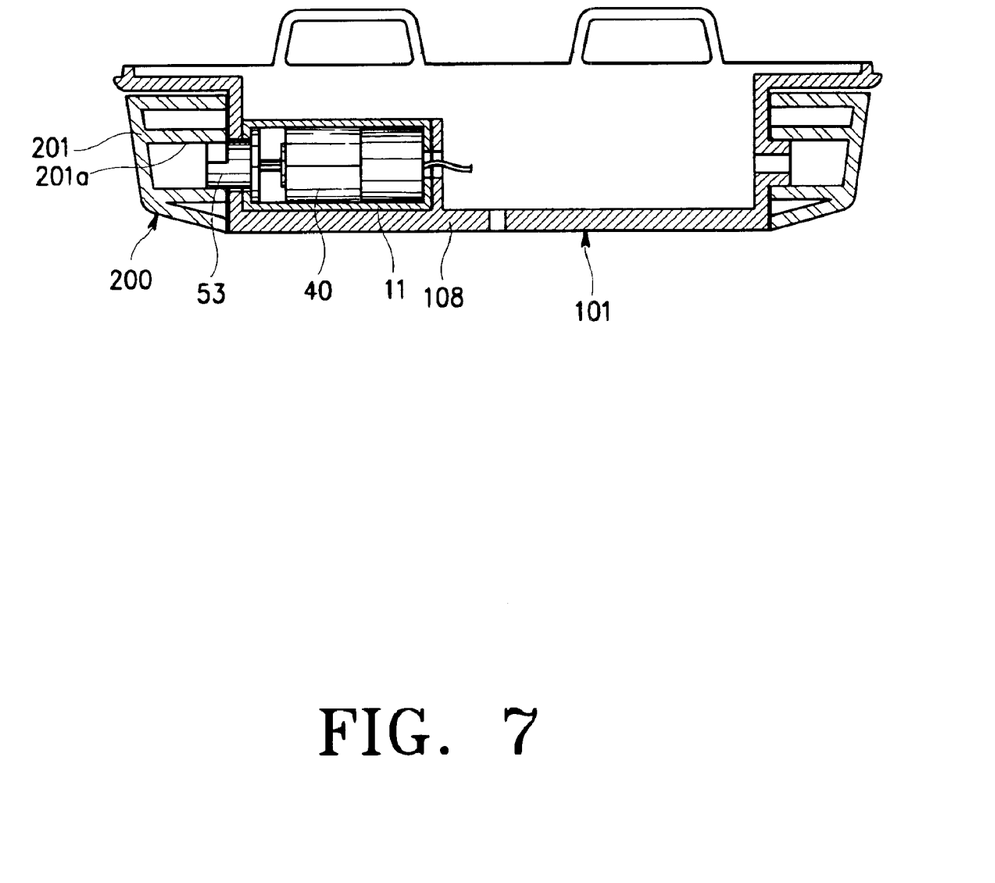
FIG. 7 is a partial cross-sectional view illustrating a state where the flip cover is assembled in the main body.

FIG. 6 is a partial exploded perspective view illustrating how to assemble a flip in a main body to which the opening/closing device according to the present invention is applied. FIG. 7 is a partial cross-sectional view illustrating a state where the flip is assembled in the main body.

Referring to FIGS. 6 and 7, the opening/closing device 10 is installed within a hinge arm 108 on the upper casing frame 101 of the main body 100. The sub-body coupler 53 of the opening/closing device 10 is installed such that a part of the sub-body coupler 53 projects from the hinge arm 108. Thus, the projected sub-body coupler 53 is coupled to a coupling member 201a formed in a socket 201 of the flip 200 so that they can rotate together.

When the sub-body (i.e., flip cover) 200 is assembled in the main body 100 such that the sub-body can be automatically opened and closed, there is required a detector for detecting an open state of the sub-body 200 to control a proper opening angle. For the detector, a lead switch for detecting a magnetic force or a photo-sensor can be typically used.

Figure 8:
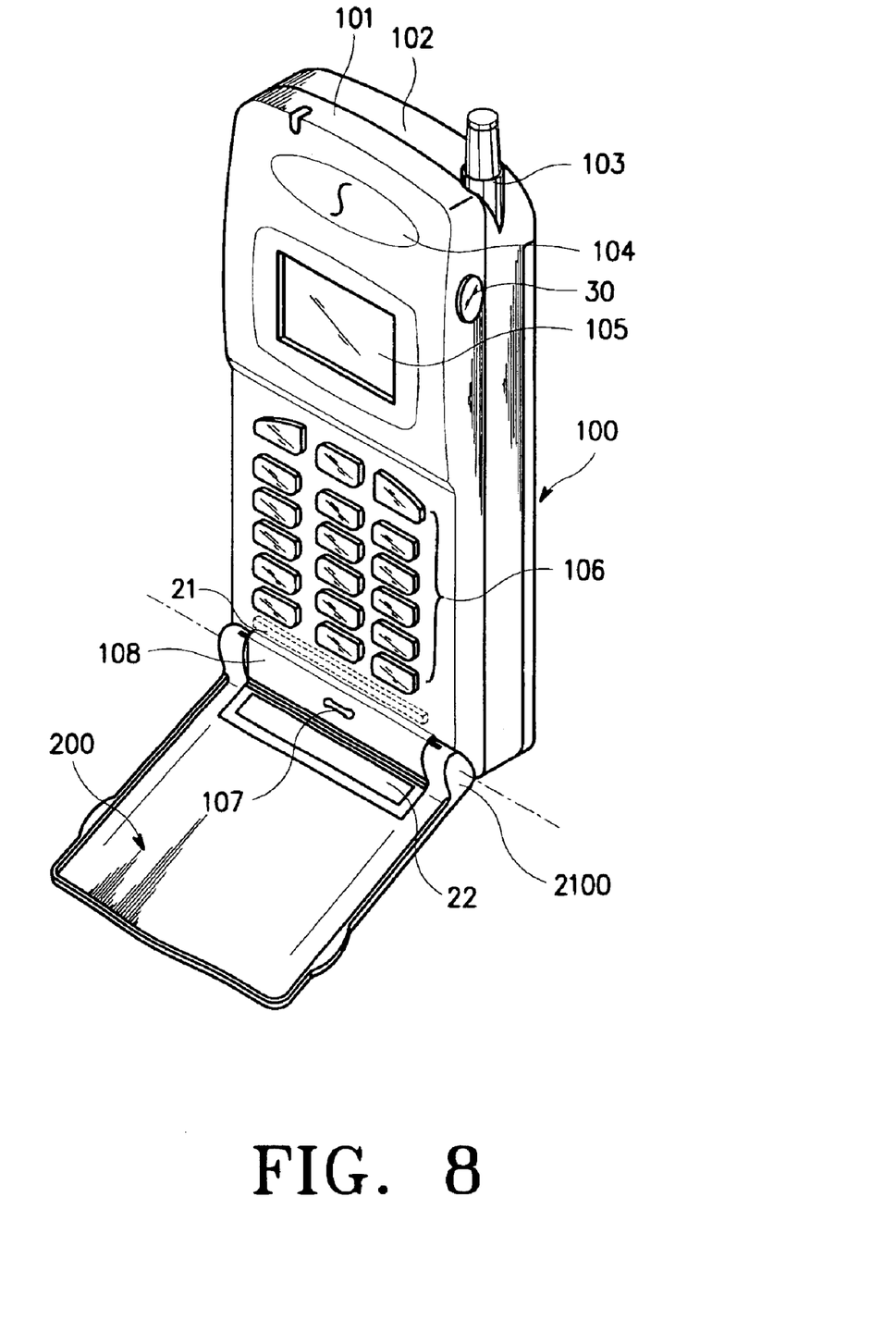
FIG. 8 is a perspective view of a mobile telephone including a switch for opening/closing the flip cover according to an embodiment of the present invention.

FIG. 8 is a perspective view of a mobile telephone including a switch for opening/closing the flip cover according to an embodiment of the present invention.

Referring to FIG. 8, the mobile telephone includes a lead switch 21 installed within the lower side of the main body 100. Further, a switch 30 for driving the opening/closing device 10 is located on the main body 100. Alternatively, it is also possible to implement the switching means for driving the opening/closing device 10 by operating (or pressing) specific key buttons on the keypad 106. A magnet 22 is attached to an inner surface of the flip cover 200 at a position corresponding to the lead switch 21.

Therefore, when the user presses the switch 30 on the main body 100, the opening/closing device 10 starts opening the flip cover 200 and continues to a predetermined angle. In the initial opening state, the lead switch 21 is still under the influence of the magnet 22 on the flip cover 200, so that the lead switch 21 is turned OFF. In the meantime, if the opening/closing device 10 continuously operates to open the flip cover 200, the device reaches a point where the lead switch 21 is no longer influenced by the magnet 22 on the flip cover 200, so that the lead switch 21 is turned ON. A controller (not shown) in the main body 100 can control the opening angle of the opening/closing device 10 by analyzing a signal output from the lead switch 21 when it is turned ON.

Meanwhile, if the user presses the switch 30 again in order to close the flip cover 200 which is now opened to the predetermined angle (e.g., 135°), the opening/closing device 10 starts closing the flip cover 200. The controller analyzes a time point when the lead switch 21 on the main body 100 is again under the influence of the magnet 22 on the flip cover 200, to stop operation of the opening/closing device 10 when the flip cover 200 is completely closed.

Figure 9:
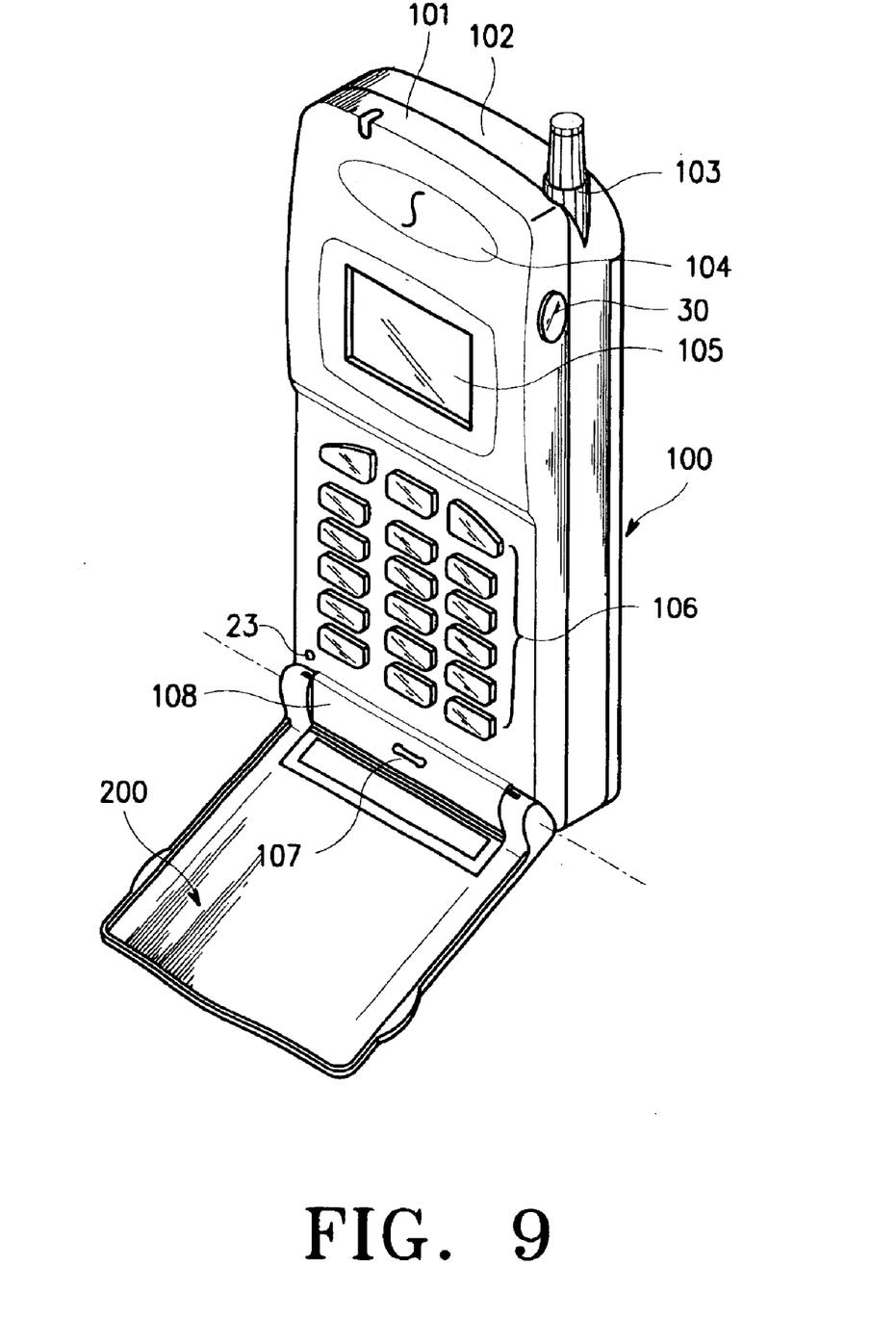
FIG. 9 is a perspective view illustrating a mobile telephone with a photo-sensor according to an embodiment of the present invention.

FIG. 9 shows a mobile telephone with a photo-sensor according to another embodiment of the present invention. Referring to FIG. 9, when the user presses the switch 30 on the main body 100, the opening/closing device 10 starts opening the flip cover 200 to a predetermined angle. In this state, a photo-sensor 23 detects an open state of the flip cover 200 and the controller controls the opening/closing device 10 based on the time point when the photo-sensor 23 detects the open state, so as to open the flip cover 200 at a proper opening angle.

Meanwhile, if the user presses the switch 30 again in order to close the flip cover 200 which was opened to the predetermined angle, the opening/closing device 10 starts closing the flip cover 200. The controller analyzes a time point when the photo-sensor 23 detects a closed state of the flip cover 200, to stop operation of the opening/closing device 10 when the flip cover 200 is completely closed.

The opening/closing device according to an embodiment of the present invention can also be applied to a folder-type mobile telephone.

Figure 10:
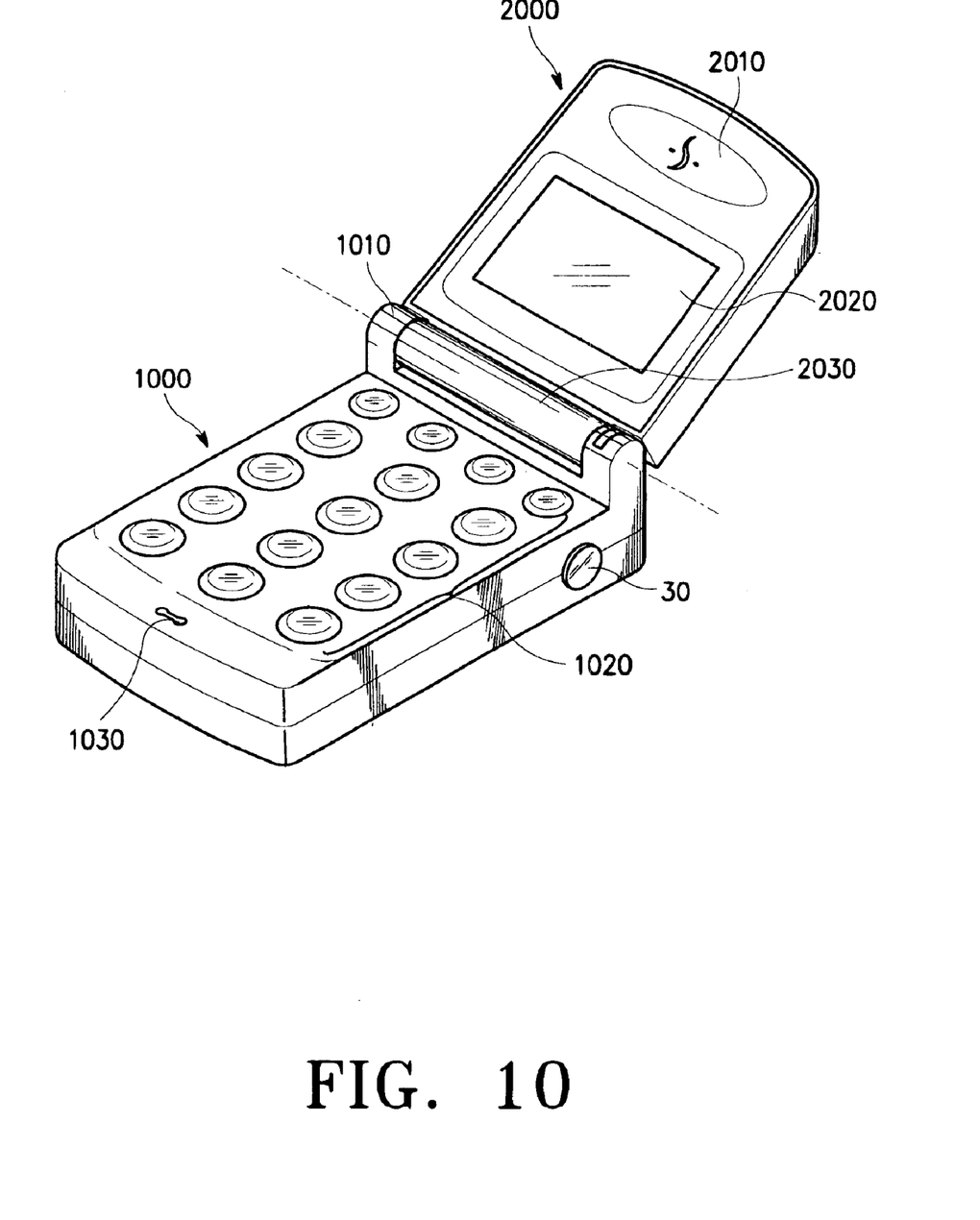
FIG. 10 is a perspective view illustrating a folder-type mobile telephone according to an embodiment of the present invention.
Figure 11:
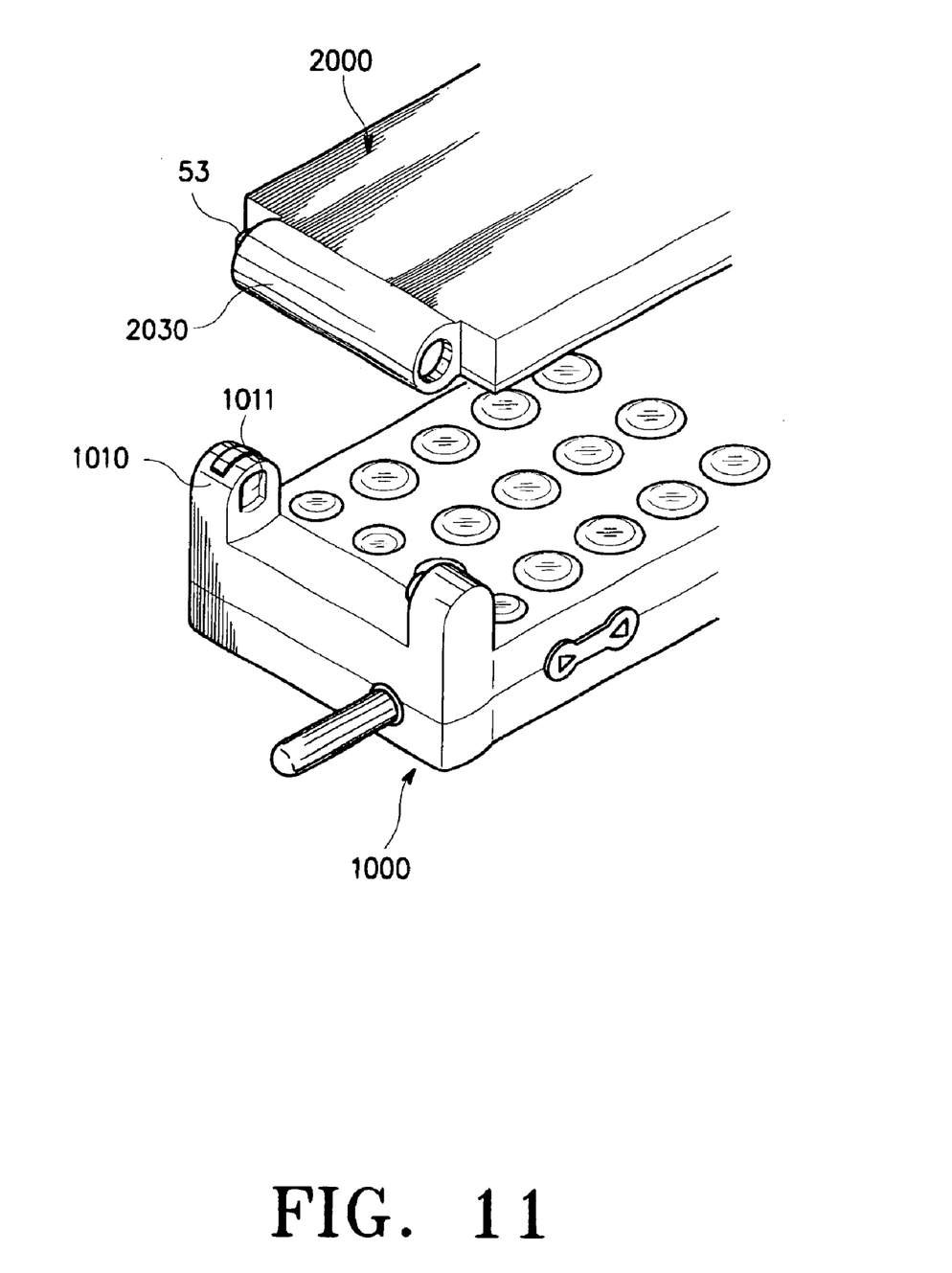
FIG. 11 is a partial exploded perspective view illustrating a folder and a main body with the opening/closing device according the present invention.
Figure 12:
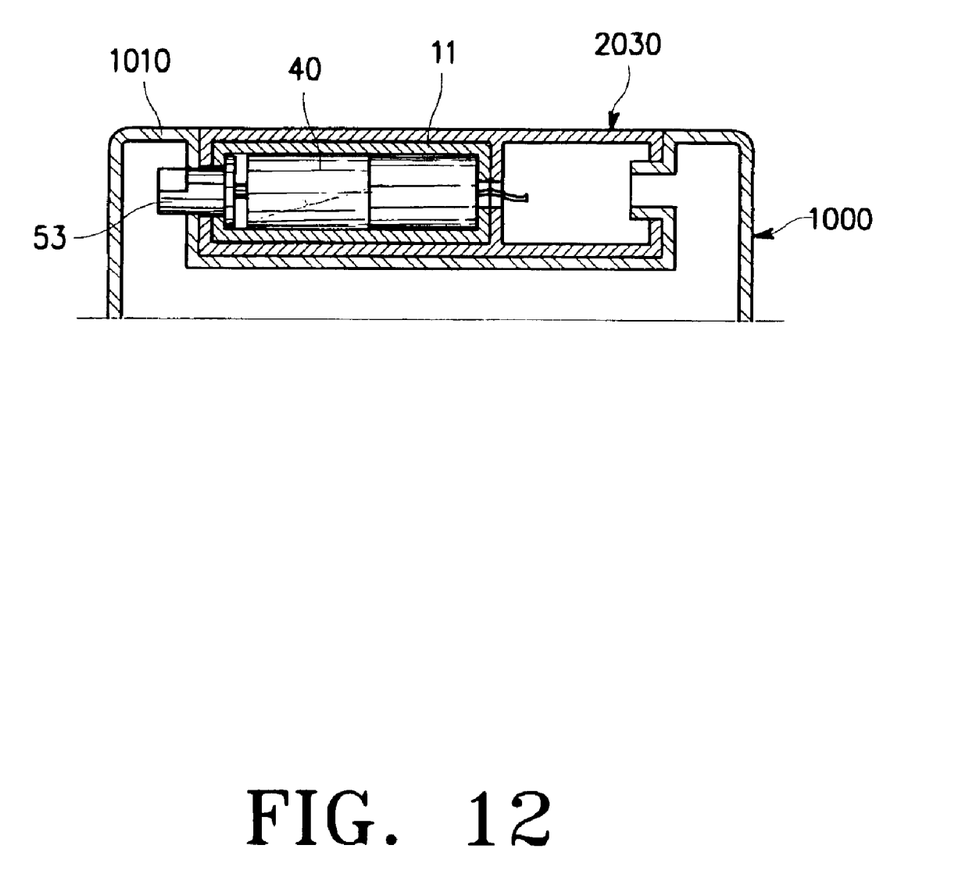
FIG. 12 is a cross-sectional view illustrating a state where the folder of FIG. 11 is assembled in the main body.

FIG. 10 is a perspective view illustrating a folder-type mobile telephone with the opening/closing device according to an embodiment of the present invention. FIG. 11 is a partial perspective view illustrating how to assemble a folder in a main body with the opening/closing device according the present invention. FIG. 12 is a cross-sectional view illustrating a state where the folder of FIG. 11 is assembled in the main body.

Referring to FIGS. 10 to 12, a folder-type mobile telephone is comprised of a main body 1000 and a folder 2000. The main body 1000 includes a keypad 1020 and a microphone 1030, and the folder 2000 includes an earpiece 2010 and an LCD 2020. The opening/closing device 10 is installed within a hinge arm 2030 of the folder 2000 such that a part of the sub-body coupler 53 should project from a through hole formed at one side of the hinge arm 2030. The sub-body coupler 53 of the opening/closing device 10 is coupled to a coupling hole 1011 formed on a combining member 1010 of the main body 1000, so that the folder (i.e., sub-body) 2000 can be opened and closed against the main body 1000. Further, a switch 30 for automatically opening and closing the folder 2000 against the main body 1000 is located on one side of the main body 1000.

Similarly, the folder-type mobile telephone also includes a detector for detecting an opening angle of the folder 2000 when it is opened and closed by operation of the switch 30, and a controller for opening the folder 2000 at a proper opening angle by analyzing an output of the detector.

For the detector, the lead switch or the photo-sensor can be typically used, as stated above. In addition, the opening/closing device according to the present invention can also be applied to a flip-up-type mobile telephone.

It can be appreciated from the foregoing description that the user can automatically open and close the sub-body against the main body by simply operating the switch. Therefore, the user can open and close the mobile telephone using one hand.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A mobile telephone including a main body and a sub-body closably mounted on the main body, comprising:
   an opening/closing device installed in the main body and operative to rotate so as to displace the sub-body and the main body relative to one another at an opening angle defined between open and closed positions of the sub-body;
   a switch for driving the opening/closing device;
   a photo-sensor operative to detect the opening angle of the opening/closing device and to generate an output signal upon detection thereof; and
   a controller operative to control rotation of the opening/closing device in response to the output signal from the photo-sensor to deactivate the opening/closing device.

2. The mobile telephone as claimed in claim 1, wherein the opening/closing device comprises:
   a hollow module housing with a through hole formed at one end thereof,
   a decelerating module fixedly inserted in the module housing and including a gear train; and
   a sub-body coupler operatively attached to the gear train fixed to an end of a driving module of the decelerating module, a part of the sub-body coupler projecting from the through hole of the module housing and being fixed to a side of the sub-body.

3. The mobile telephone as claimed in claim 2, wherein the decelerating module comprises:
   a driving motor; and
   a decelerating device coupled to the driving motor, for reducing the number of rotations and increasing a driving force of the driving motor.

4. The mobile telephone as claimed in claim 1, wherein the switch for driving the opening/closing device is activated by pressing specific keys on a keypad of the mobile telephone.

5. The mobile telephone as claimed in claim 1, wherein the photo-sensor is turned on and off according to opening and closing of the sub-body.

6. The mobile telephone as claimed in claim 1, wherein the sub-body is a flip cover.

7. The mobile telephone as claimed in claim 1, wherein the sub-body is a folder.

8. The mobile telephone as claimed in claim 3, wherein the decelerating device comprises:
   a reduction gear assembly rotatably coupled to the driving motor, and
   a driving shaft rotatably fixed to the reduction gear assembly to rotate at a rotational speed, which is lower than a rotational speed of the driving motor.

9. A mobile telephone including a main body and a sub-body closably mounted on the main body, comprising:
   an opening/closing device installed in the main body and operative to rotate so as to displace the sub-body and the main body relative to one another between fully open and fully closed positions of the sub-body;
   a switch for driving the opening/closing device;
   a detector operative to detect an intermediary open position of the sub-body and to generate an output signal upon detection thereof; and
   a controller coupled to the detector and operative to control rotation of the opening/closing device in response to receiving the output signal from the detector to a predetermined opening angle by deactivating the opening/closing device in the fully open position of the sub-body.

10. The mobile telephone of claim 9, wherein the main body and sub-body have inner ends located adjacent to one another in the fully open and closed positions of the sub-body, the detector being located on one of the inner ends of the main body and sub-body and being operative to generate the output signal in response to detecting the intermediary open position of the sub-body.

* * * * *